United States Patent [19]
Lawson et al.

[11] Patent Number: 5,281,056
[45] Date of Patent: Jan. 25, 1994

[54] INDEXING NOSE COUPLE

[75] Inventors: John R. Lawson, Columbia, S.C.; Jay G. Palmer, Brier, Wash.

[73] Assignee: Cooper Industries, Inc., Houston, Tex.

[21] Appl. No.: 729,675

[22] Filed: Jul. 15, 1991

[51] Int. Cl.$^5$ .............................. B23B 45/14
[52] U.S. Cl. ...................... 408/1R; 408/97; 408/72 R; 173/32
[58] Field of Search ............ 173/1, 32, 37; 408/113, 408/1 R, 95, 97, 72 R; 279/30, 75

[56] References Cited

U.S. PATENT DOCUMENTS

| | | | |
|---|---|---|---|
| 4,174,113 | 11/1979 | Eckman | 279/75 |
| 4,184,692 | 1/1980 | Benson et al. | 279/75 |
| 4,395,051 | 7/1983 | Tonomura | 279/75 |
| 4,588,334 | 5/1986 | Khurana | 408/97 |
| 4,668,134 | 5/1987 | Vindez | 408/97 |
| 4,764,060 | 8/1988 | Khurana | 408/97 |

Primary Examiner—Frank T. Yost
Assistant Examiner—Allan M. Schrock
Attorney, Agent, or Firm—William B. Patterson; Eddie E. Scott; Alan R. Thiele

[57] ABSTRACT

An indexing coupling for a drill includes a hollow inner race, a hollow outer race, and a sleeve member. The hollow inner race and hollow outer race are affixed to one another by a plurality of ball members which are positioned by a plurality of detents in the hollow inner race. The balls also extend into holes in the hollow outer race. When the balls are positioned within the holes in the hollow outer race and within the detents in the hollow inner race by the sleeve member, the hollow inner race and the hollow outer race are rigidly connected one with respect to the other. When the sleeve member is moved the ball members become disengaged from the hollow inner race thus allowing indexing of the outer race with respect to the hollow inner race. This indexing of the hollow outer race with respect to the hollow inner race allows selective rotatable indexing of the drill housing with respect to the nose piece.

9 Claims, 2 Drawing Sheets

INDEXING NOSE COUPLE

BACKGROUND OF THE INVENTION

The present invention relates to power tools; more particularly, the present invention relates to power drills in which a nose piece and drill bushing are utilized for guiding a drill bit through a drill fixture into a work piece.

In many drilling operations, particularly related to the assembly of aircraft, it is well known to utilize drilling apparatus including a nose piece with a taper lock drill bushing mounted at the outboard end. The taper lock drill bushing is used to lock the drilling apparatus to a drill fixture. The drill fixture is then positioned over a work piece. Typically, the drill fixture is rigidly mounted to the work piece to assure accurate placement of the drilled hole.

Drill fixtures include two fasteners which are used to lock the taper lock drill bushing in position against the drill fixture. The taper lock drill bushing is usually threaded into the nose piece at the end of a power drill and the nose piece is then rigidly attached to the power drill. Consequently, when the nose piece and taper lock drill bushing are attached to the power drill, the power drill is firmly affixed to the drill fixture. This allows for accurate drilling of a hole in the work piece.

A problem arises when the drilling apparatus has an outwardly extending appendage. Such outwardly extending appendage may contain operational controls, a power source or speed reduction gearing. When it is necessary to rotate the entire drilling apparatus to position the taper lock drill bushing with respect to the fasteners which extend from the drill fixture, the outwardly extending appendage may butt up against a bulk-head, a wall or a spar. Such problems most frequently occur when a hole is to be drilled near a corner. This contact of the outwardly extending appendage against the bulk-head, wall or spar prevents full rotation of the drilling apparatus and thus prevents proper engagement of the taper lock drill bushing with the fasteners which extend from the drill fixture. To solve this problem a system is required in which the nose piece may be selectively and rotatably indexed with respect to the rest of the drill apparatus while the drill apparatus is in position for drilling a hole. Such system would allow the outwardly extending appendage to not interfere with the locking of the drilling apparatus to the drill fixture.

SUMMARY OF THE INVENTION

The indexing coupling described herein provides a system in which the nose piece portion of a drill apparatus may be selectively rotated or indexed to a variety of different locking positions with respect to the rest of the drill apparatus. Such selective rotation will allow positioning of the drill apparatus in locations with limited space such as corners.

The indexing coupling of the present invention includes a hollow inner race, a hollow outer race, and a sleeve member. The hollow inner race bears against the power drill housing and is lockably engaged with the hollow outer race by positioning a plurality of ball members between the two races. The outer race threadably engages the drill housing. The nose piece threadably engages the inner race. Accordingly, the nose piece is positioned with respect to the housing by positioning the inner race with respect to the outer race.

A better understanding of the device of the present invention may be had from a brief explanation of the construction of each part and its interaction with the other parts.

The hollow outer race has a internally threaded proximal end for rigid attachment to the drill housing and a reduced diameter central portion over which a coil spring is positioned. The coil spring positions the sleeve member with respect to the hollow outer race and further positions the ball members to lock the hollow inner race to the hollow outer race. Travel of the sleeve member with respect to the inner race is limited by a snap ring affixed to the hollow inner race. Accordingly, when the sleeve member is moved away from the snap ring toward the drill housing by compressing the spring the ball members which heretofore were positioned between the hollow inner race and the hollow outer race move radially away from the hollow inner race. This outward movement of the ball members unlocks the hollow outer race from the hollow inner race and permits rotation of the inner race with respect to the drill housing. Because the nose piece is threadably attached to the inner race the nose piece is similarly rotated with respect to the drill housing.

When the sleeve member is moved away from the drill housing back to the snap ring by allowing the coil spring to extend, the ball members are moved by the sleeve member into detents in the exterior surface hollow inner race. Because a portion of the ball members reside in holes in the hollow outer race, this movement of the ball members into the detects in the hollow inner race locks the hollow inner race to the hollow outer race. The position of the sleeve member prevents outward movement of the ball members away from the detents in the inner race through the holes in the outer race. As the hollow outer race is rigidly affixed to the drill housing, this positioning of the ball members by the sleeve member also affixes the position of the hollow inner race with respect to the drill housing. As the hollow inner race is threadably attached to the nose piece section the nose piece may then be selectively oriented with respect to the drill housing. This allows positioning of the drill apparatus such that any outwardly extending appendage may be rotated away from contact with a wall, spar or bulk-head without affecting the operation of the drill.

BRIEF DESCRIPTION OF THE FIGURES

A better understanding of the indexing coupling of the present invention may be had by reference to the figures wherein.

BRIEF DESCRIPTION OF THE EMBODIMENTS

Figure 1:
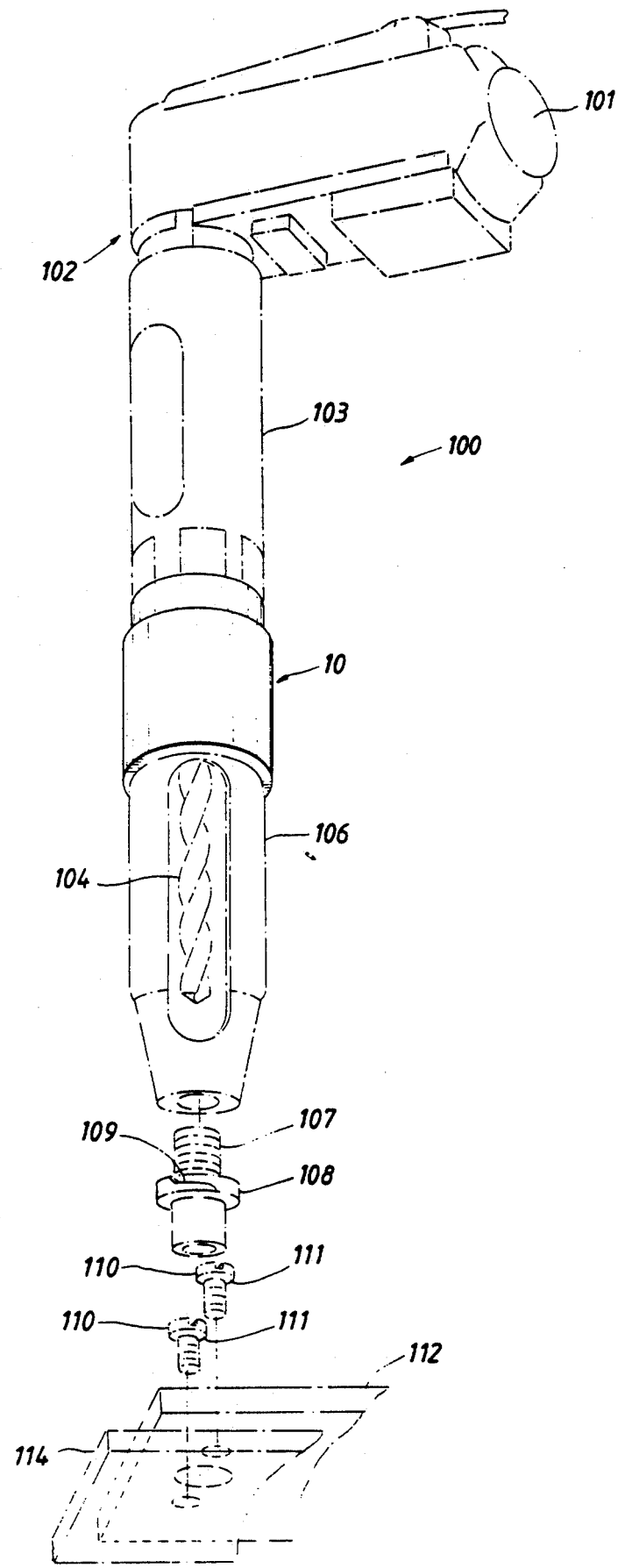
FIG. 1 is a perspective view of the indexing coupling of the present invention installed in a drilling apparatus.

As may be seen by reference to FIG. 1, a drilling system 100 typically includes a power unit 102. Attached to the power unit 102 is a chuck (not shown) for holding and rotating a drill bit 104. At the front end of drilling system 100 is nose piece 106. The nose piece 106 provides a mounting for a taper lock drill bushing 108. The taper lock drill bushing includes a cam surface 109 which interacts with the undersides 111 of the heads of two fasteners 110. The fasteners 110 are positioned with respect to a drill fixture 112 over a work piece 114. Therefore when it is desired to drill a hole in work piece 114, drill fixture 112 is placed over the site of the hole in work piece 114.

Drilling system 100 is rigidly positioned with respect to drill fixture 112 by the interaction of the cam surface 109 of the taper lock drill bushing 108 with the underside 111 of the fasteners 110 which protrude from the drill fixture 112. Taper lock drill bushing 108 threadably 107 engages nose piece 106. The advancing drill bit 104 passes through and is guided by taper lock drill bushing 109, thence through drill fixture 112 and into work piece 114.

When it is desired to disengage the drilling system 100 from the drill fixture 112 the operator rotates the drilling system 100 around its long axis. Taper lock drill bushing 108 disengages fasteners 110 and drilling system 100 is moved away from drill fixture 112.

As may be further seen with reference to FIG. 1, there is oftentimes an outwardly extending appendage 101 protruding from the long axis of the drill system 100. If the drilling system 100 is to be used in a confined place, it may not be possible to rotate the complete drilling system 100 sufficiently to turn the taper lock drill bushing 108 such that its cam surface 109 fully travels along the underside 111 of fasteners 110. Such a situation may occur when an appendage 101 of the drilling system 100 hits against a bulk-head, wall or spar. Without full engagement or the taper lock bushing 108 with the drill fixture 112, drilling system 100 may wobble thus causing an improperly positioned hole, a hole with a skewed axis or a hole with an unacceptable surface finish. Accordingly, there is a need to be able to selectively and rotatably index the position of the nose piece 100 with respect to the drill power unit 103 such that the drilling system 100 may be fully engaged with drill fixture 112 and properly used irrespective of the position of the bulk-head, wall or spar.

Figures 2, 3:
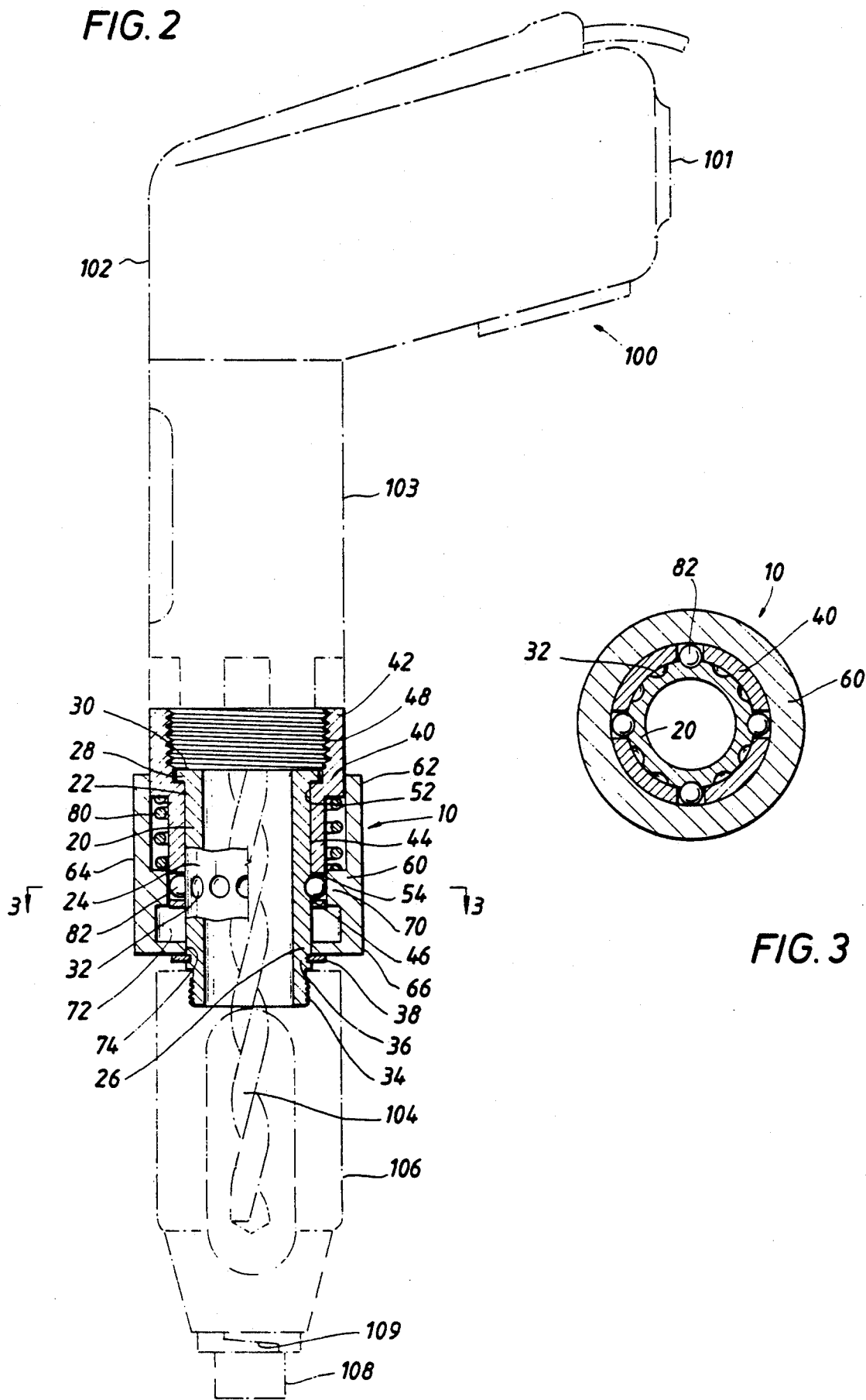
FIG. 2 is a cross sectional side view of the indexing coupling in a drilling apparatus.
FIG. 3 is a section view taken through line 3—3.

Operation of the indexing coupling 10 of the present invention may be seen with respect to FIG. 2. Therein it may be seen that the indexing coupling 10 of the present invention s mounted between the housing 103 of the power unit 102 of a drilling system 100 and the nose piece 106 at the end of the drilling system 100 into which the taper lock drill bushing 108 is threaded.

Beginning at the centerline of drill bit 104 and proceeding radially outward it may be seen that the indexing coupling 10 of the present invention has three essential parts: hollow inner race 20, hollow outer race 40 and sleeve member 60. Hollow inner race 20 includes a proximal portion 22 which has a surface 30. Surface 30 engages the exterior portion of the drill housing 103. In the preferred embodiment this surface 30 includes a flange 28. In the central portion 24 of hollow inner race 20 are a series of detents 32 spaced radially around the exterior of hollow inner race 20. At the distal portion 26 of the hollow inner race 20 is a groove 36 for mounting a snap ring 38. Utilization of the snap ring 38 will be described along with operation of sleeve member 60. Hollow inner race 20 also includes threads 34 for rigid engagement with nose piece 106.

Fitting around the hollow inner race 20 is a hollow outer race 40. The hollow outer race 40 is threadably 48 attached in a rigid fashion to the drill housing 103 at its proximal end 42. In the central portion 44 is a reduced diameter portion 52 over which a biasing means such as a coil spring 80 is placed. The utilization of the coil spring 80 will be explained later.

At the distal end 46 of the hollow outer race 40 there are a plurality of holes 54 into which ball members 82 fit. The ball members 82 mate with the detents 32 in the hollow inner race 20 and are small enough so as to pass through holes 54 in hollow outer race 40. When the ball members 82 are partially in detents 32 and partially in holes 54, hollow inner race 20 is lockably positioned with respect to hollow outer race 40.

Outside of hollow outer race 40 is a sleeve member 60. The sleeve member 60 is constructed to slide over the outer portion of the hollow outer race 40 at its proximal end 42 and to contain the coil spring 80 in its central portion 64. Sleeve member 60 includes a reduced diameter portion 70 at its distal end 66 for retaining the ball members 82 within the holes 54 in the hollow outer race 40. At the far distal end 66 of the sleeve member 60, an opening 74 is formed to slide over the outer portion of the hollow inner race 20. The sleeve member 60 is retained in position and limited in its distal travel by butting up against the snap ring 38 which, as previously stated, is attached to the hollow inner race 20.

OPERATION

When it is desired to utilize the indexing coupling 10 of the present invention the sleeve member 60 is moved back toward the drill housing 103. The proximal end 62 of the sleeve member 60 slides over the proximal end 42 of the hollow outer race 40. This compresses the coil spring 80 by engagement of the edge of the reduced diameter portion 70 of sleeve member 60 with the end of the coil spring 80. This permits the ball members 82 to move outwardly from the detents 32 in the hollow inner race 20 thence through the holes 54 in the hollow outer race 40 into a space 72 formed in the distal portion 66 of the sleeve member 60. The movement of the ball members 82 away from the detents 32 in the hollow inner race 20 thus disengages the hollow inner race 20 from the hollow outer race 40. The nose piece 106 may then be rotated or indexed with respect to drill housing 103.

The rotation of the nose piece 106 causes the hollow inner race 20 to rotate because of the threaded connection 34 between the nose piece 106 and the hollow inner race 20. The proximal end 22 of the hollow inner race 20 slides on the face of the power unit housing 103. When the nose piece 106 has been indexed to the proper position the sleeve member 60 is released. Coil spring 80 within the sleeve member 60 causes sleeve member 60 to move away from housing 103 until its distal end 66 abuts snap ring 38 which is affixed to the hollow inner race 20. The reduced diameter portion 70 of the sleeve member 60 covers the holes 54 in the hollow outer race 40 thus limiting the travel of the ball members 82 away from the detents 32 in the hollow inner race 20 and causing ball members 82 to engage both the hollow inner race 20 and the holes 54 in the hollow outer race 40. The hollow inner race 20 and the hollow outer race 40 are then lockably affixed together by the ball members 82. Once the hollow inner race 20 and hollow outer race 40 have been so affixed together the entire drill system 100 may be utilized.

The number of indexing positions to which the nose piece 106 may be rotated with respect to housing 103 is controlled by the size and position of ball members 82. It has been found that three ball members 82 provide the required amount of rotatable indexing to position drill apparatus 100 in most situations.

The utilization of drilling system 100 requires engagement of the cam surface 109 of the taper lock drill bushing 108 with fasteners 110 which protrude out of a fixture 112 placed over a work piece 114 as shown in FIG. 1. Once the taper lock drill bushing 108 is engaged with drill fixture 112 the power unit 102 may then be activated and the drill bit 104 moved forward such that a hole is drilled in the work piece 114.

There is thereby provided by the indexing coupling 10 of the present invention a means for rotating the housing 103 of the power unit 102 of a drilling apparatus 100 with respect to the nose piece 106 to avoid butting up against a bulk-head, wall or spar.

While the indexing nose coupling 10 of the present invention has been shown by reference to its preferred embodiment, it will be understood by those of ordinary skill in the art that other embodiments of the indexing nose coupling of the present invention may be fabricated by those of ordinary skill in the art once having read the foregoing disclosure.

We claim:

1. An indexing coupling for positioning a nose piece with respect to a drill housing, said indexing coupling comprising:
   a hollow inner race, said hollow inner race having:
      a bearing surface at its proximal end, said bearing surface constructed and arranged to engage the drill housing;
      a plurality of radially spaced detents in the central portion of said hollow inner race;
      means for engaging the nose piece at its distal end;
   a plurality of ball members constructed and arranged to fit within said radially spaced detents;
   a hollow outer race, said hollow outer race having:
      an internally threaded proximal end;
      a reduced diameter central portion;
      at least one radially positioned hole at its distal end;
   a sleeve member, said sleeve member constructed and arranged to:
      slideably engage the proximal end of said outer race;
      slideably engage the distal end of said outer race;
      slideably engage the distal end of said inner race;
   biasing means positioned over said reduced diameter central portion of said hollow outer race;
   means for limiting the distal travel of said sleeve member;
   whereby when said sleeve member is moved proximally toward the drill housing against said biasing means, said ball members may move radially away from said detents thus permitting the rotational movement of said hollow inner race with respect to the drill housing and when said sleeve member is moved distally by said biasing means, said ball members are moved into said detents thus locking the position of said hollow inner race with respect to the drill housing.

2. The indexing coupling as defined in claim 1 wherein said biasing means is a coil spring.

3. The nose coupling as defined in claim 2 wherein the means for limiting the distal travel of said sleeve member is a snap ring.

4. A drilling system comprising:
   a source of rotational power;
   means for holding a drill bit retaining chuck rotatably attached to said source of rotational power;
   a drill bit constructed and arranged to be engaged by said means for holding a drill bit;
   a nose piece;
   a locking bushing frictionally affixed to the end of said nose piece and a coupling for attaching said nose piece to said source of rotational power, said nose piece further including:
      a hollow inner race, said hollow inner race having:
         a bearing surface at it proximal end, said bearing surface constructed and arranged to engage the drill housing;
         a plurality of radially spaced detents in the central portion of said hollow inner race;
         means for engaging the nose piece at its distal end;
      a plurality of ball members constructed and arranged to fit within said radially spaced detents;
      a hollow outer race, said hollow outer race having:
         an internally threaded proximal end;
         a reduced diameter central portion;
         at least one radially positioned hole at its distal end;
      a sleeve member, said sleeve member constructed and arranged to:
         slideably engage the proximal end of said outer race;
         slideably engage the distal end of said outer race;
         slideably engage the distal end of said inner race;
         biasing means positioned over said reduced diameter central portion of said hollow outer race;
         means for limiting the distal travel of said sleeve member;
      whereby when said sleeve member is moved proximally toward the drill housing against said biasing means, said ball members may move radially away from said detents thus permitting the rotational movement of said hollow inner race with respect to the drill housing and when said sleeve member is moved distally by said biasing means, said ball members are moved into said detents thus locking the position of said hollow inner race with respect to the drill housing.

5. The indexing coupling as defined in claim 4 wherein said biasing means is a coil spring.

6. The nose coupling as defined in claim 5 wherein the means for limiting the distal travel of said sleeve member is a snap ring.

7. A method for indexing the position of a nose piece with respect to a drill housing comprising the steps of:
   rotatably positioning a hollow inner race with respect to the nose piece;
   rigidly positioning a hollow outer race with respect to the drill housing;
   lockably positioning said hollow inner race with respect to said hollow outer race by a plurality of ball members seated in detents in said hollow inner race and holes within said hollow outer race;
   retaining said ball members in position by a sleeve member;
   positioning said sleeve member by biasing means and retaining means;
   whereby when said sleeve member is moved toward the drill housing, said biasing means is compressed thus allowing the travel of said ball members away from said hollow inner race and the rotation of said inner race with respect to said hollow outer race and when said sleeve member is released, said biasing means pushes said sleeve member against said retention means thus rigidly interconnecting said hollow inner race to said hollow outer race.

8. A coupling for use between a drill housing and a nose piece for housing, said coupling comprising:
   means for attachment to the drill housing, said means including a hollow outer race;
   means for attachment to said nose piece, said means including a hollow inner race; and
   means for selectively rotatably indexing the position of said nose piece with respect to said drill housing, said means including a plurality of ball members positioned between said hollow outer race and said hollow inner race.

9. The coupling as defined in claim 8 wherein said ball members are held in position by a sleeve member.

* * * * *